(No Model.)
H. SCHAUBEL.
BOILER TUBE FASTENING.
No. 405,225. Patented June 11, 1889.
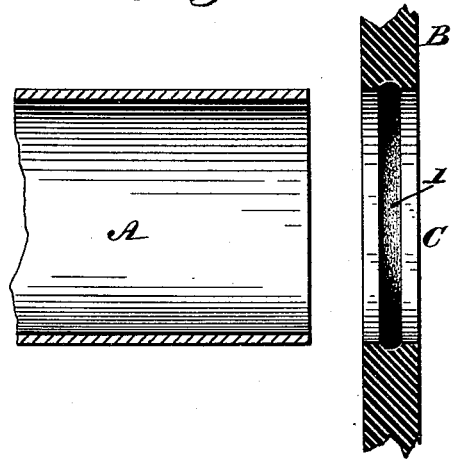
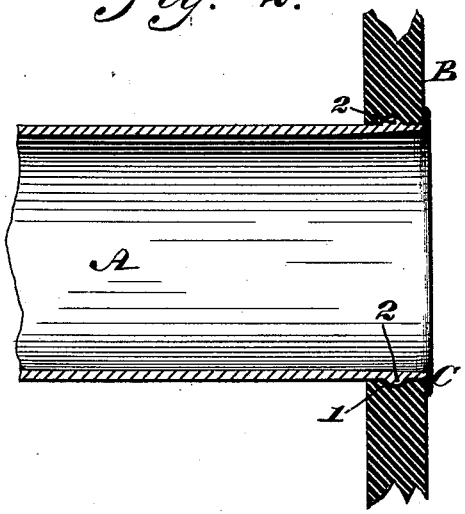
Witnesses
L. Douville,
A. P. Jennings.
Inventor
Henry Schaubel
By his Attorneys
Wiedersheim & Kintner

UNITED STATES PATENT OFFICE.

HENRY SCHAUBEL, OF PHILADELPHIA, PENNSYLVANIA, ASSIGNOR OF ONE-HALF TO HENRY W. MILLER, JR., OF SAME PLACE.

BOILER-TUBE FASTENING.

SPECIFICATION forming part of Letters Patent No. 405,225, dated June 11, 1889.

Application filed December 21, 1888. Serial No. 294,273. (No model.)

*To all whom it may concern:*

Be it known that I, HENRY SCHAUBEL, a citizen of the United States, residing in the city and county of Philadelphia, State of Pennsylvania, have invented a new and useful Improvement in Boiler-Tube Fastenings, which improvement is fully set forth in the following specification and accompanying drawings.

My invention consists of improvements in means for fastening a boiler-tube to the tube sheet or plate, and embodies a swaged tongue on the tube and a swaged groove in the opening of the sheet, whereby the connection of the tube and sheet is easily accomplished, a tight joint provided, and the wall of the opening strengthened, owing to the swaging to which it is subjected.

Figures 1 and 2 represent longitudinal sections of pieces of boiler-tubes and tube-sheets embodying my invention.

Similar letters and numerals of reference indicate corresponding parts in the two figures.

Referring to the drawings, A designates a piece of a boiler-tube, and B a piece of the tube-sheet thereof. In the wall of the opening C of said tube-sheet is a groove 1, which extends circumferentially around the same, and on the outer periphery of the tube, near the end thereof, is a bead or tongue 2, which occupies said groove, thus connecting the tube with the sheet.

In carrying out my invention the tube has primarily a plain periphery, as shown in Fig. 1, and is inserted into the opening C. A proper tool or implement is then placed within the end of the tube and operated, so as to swage said end, and thus force the metal circumscribed by the groove 1 into said groove, the result being the bead or tongue 2, it being seen that the joint produced is tight, reliable, and durable, and one by which creeping of the tube on the sheet is prevented.

It is evident that the joint is applicable to tubes and flues for the passage of hot air and other fluids and not limited to those for steam.

I am aware that it is not new to secure a tube to a boiler by forcing or swaging the metal of the tube into a groove in the wall of the opening of the tube-sheet, said groove being formed by cutting out the metal in said wall; but in my case the groove is formed by swaging. Hence the tube-sheet is thoroughly grooved and not weakened by the removal of metal—a matter of great importance, especially in steam-boilers.

This application is not intended to embrace the subject-matter described and claimed by me in a pending application of date December 21, 1888, bearing Serial No. 294,274, relating to improvements in boiler-fastenings.

Having thus described my invention, what I claim as new, and desire to secure by Letters Patent, is—

A tube with a swaged tongue thereon, in combination with a tube-sheet, the opening whereof having in its wall a swaged groove which receives said swaged tongue, forming an improvement in tube-fastenings, as stated.

HENRY SCHAUBEL.

Witnesses:
 JOHN A. WIEDERSHEIM,
 JAMES F. KELLY.